(12) United States Patent
Pick et al.

(10) Patent No.: US 11,683,820 B2
(45) Date of Patent: Jun. 20, 2023

(54) FREQUENCY-DOMAIN PREAMBLE WITH A TIME-DOMAIN SINGLE CARRIER WAVEFORM

(71) Applicant: QUALCOMM Incorporated, San Diego, CA (US)

(72) Inventors: Jacob Pick, Beit Zait (IL); Shay Landis, Hod Hasharon (IL); Amit Bar-Or Tillinger, Tel-Aviv (IL); Yehonatan Dallal, Kfar Saba (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 17/247,309

(22) Filed: Dec. 7, 2020

(65) Prior Publication Data

US 2022/0183013 A1 Jun. 9, 2022

(51) Int. Cl.
| | |
|---|---|
| *H04W 72/53* | (2023.01) |
| *H04W 72/0446* | (2023.01) |
| *H04L 27/26* | (2006.01) |
| *H04L 5/00* | (2006.01) |
| *H04W 72/0453* | (2023.01) |
| *H04W 72/23* | (2023.01) |

(52) U.S. Cl.
CPC .......... *H04W 72/53* (2023.01); *H04L 5/0007* (2013.01); *H04L 27/2607* (2013.01); *H04W 72/0446* (2013.01); *H04W 72/0453* (2013.01); *H04W 72/23* (2023.01)

(58) Field of Classification Search
CPC .......... H04W 72/0493; H04W 72/042; H04W 72/0446; H04W 72/0453; H04L 5/0007; H04L 27/2607; H04L 27/2695; H04L 27/26025; H04L 27/261
See application file for complete search history.

(56) References Cited

U.S. PATENT DOCUMENTS

| | | | |
|---|---|---|---|
| 2010/0008436 A1* | 1/2010 | Zhang | H04L 1/0079 375/260 |
| 2018/0254826 A1* | 9/2018 | Jungnickel | H04W 36/38 |
| 2020/0059335 A1* | 2/2020 | Hu | H04L 27/20 |

OTHER PUBLICATIONS

Liu et al., "OFDM Preamble Design for Synchronization Under Narrowband Interference", Mar. 2013 (Year: 2013).*

* cited by examiner

*Primary Examiner* — Jae Y Lee
*Assistant Examiner* — Aixa A Guadalupe Cruz
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive, in a slot, a preamble provided based at least in part on an orthogonal frequency division multiplexing (OFDM) waveform. The UE may perform an estimation operation based at least in part on the preamble. The UE may receive, in the slot, a data transmission via a single carrier time-domain waveform based at least in part on the estimation operation. Numerous other aspects are provided.

30 Claims, 9 Drawing Sheets

FREQUENCY-DOMAIN PREAMBLE WITH A TIME-DOMAIN SINGLE CARRIER WAVEFORM

FIELD OF THE DISCLOSURE

Aspects of the present disclosure generally relate to wireless communication and to techniques and apparatuses for providing a frequency-domain preamble with a time-domain single carrier waveform.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, in a slot, a preamble provided based at least in part on an orthogonal frequency division multiplexing (OFDM) waveform; performing an estimation operation based at least in part on the preamble; and receiving, in the slot, a data transmission via a single carrier time domain waveform based at least in part on the estimation operation.

In some aspects, a method of wireless communication performed by a transmitter includes transmitting, in a slot, a preamble provided based at least in part on an OFDM waveform, wherein the preamble occupies a first symbol of the slot and a data transmission occupies one or more remaining symbols of the slot; and transmitting, in the slot, the data transmission via a single carrier time domain waveform.

In some aspects, a UE for wireless communication includes a memory; and one or more processors operatively coupled to the memory, the memory and the one or more processors configured to: receive, in a slot, a preamble provided based at least in part on an OFDM waveform; perform an estimation operation based at least in part on the preamble; and receive, in the slot, a data transmission via a single carrier time domain waveform based at least in part on the estimation operation.

In some aspects, a transmitter for wireless communication includes a memory; and one or more processors operatively coupled to the memory, the memory and the one or more processors configured to: transmit, in a slot, a preamble provided based at least in part on an OFDM waveform, wherein the preamble occupies a first symbol of the slot and a data transmission occupies one or more remaining symbols of the slot; and transmit, in the slot, the data transmission via a single carrier time domain waveform.

In some aspects, a non-transitory computer-readable medium storing a set of instructions for wireless communication includes one or more instructions that, when executed by one or more processors of a UE, cause the UE to: receive, in a slot, a preamble provided based at least in part on an OFDM waveform; perform an estimation operation based at least in part on the preamble; and receive, in the slot, a data transmission via a single carrier time domain waveform based at least in part on the estimation operation.

In some aspects, a non-transitory computer-readable medium storing a set of instructions for wireless communication includes one or more instructions that, when executed by one or more processors of a transmitter, cause the transmitter to: transmit, in a slot, a preamble provided based at least in part on an OFDM waveform, wherein the preamble occupies a first symbol of the slot and a data transmission occupies one or more remaining symbols of the slot; and transmit, in the slot, the data transmission via a single carrier time domain waveform.

In some aspects, an apparatus for wireless communication includes means for receiving, in a slot, a preamble provided based at least in part on an OFDM waveform; means for performing an estimation operation based at least in part on the preamble; and means for receiving, in the slot, a data transmission via a single carrier time domain waveform based at least in part on the estimation operation.

In some aspects, an apparatus for wireless communication includes means for transmitting, in a slot, a preamble provided based at least in part on an OFDM waveform, wherein the preamble occupies a first symbol of the slot and a data transmission occupies one or more remaining symbols of the slot; and means for transmitting, in the slot, the data transmission via a single carrier time domain waveform.

Aspects generally include a method, apparatus, system, computer program product, non-transitory computer-readable medium, user equipment, base station, transmitter, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
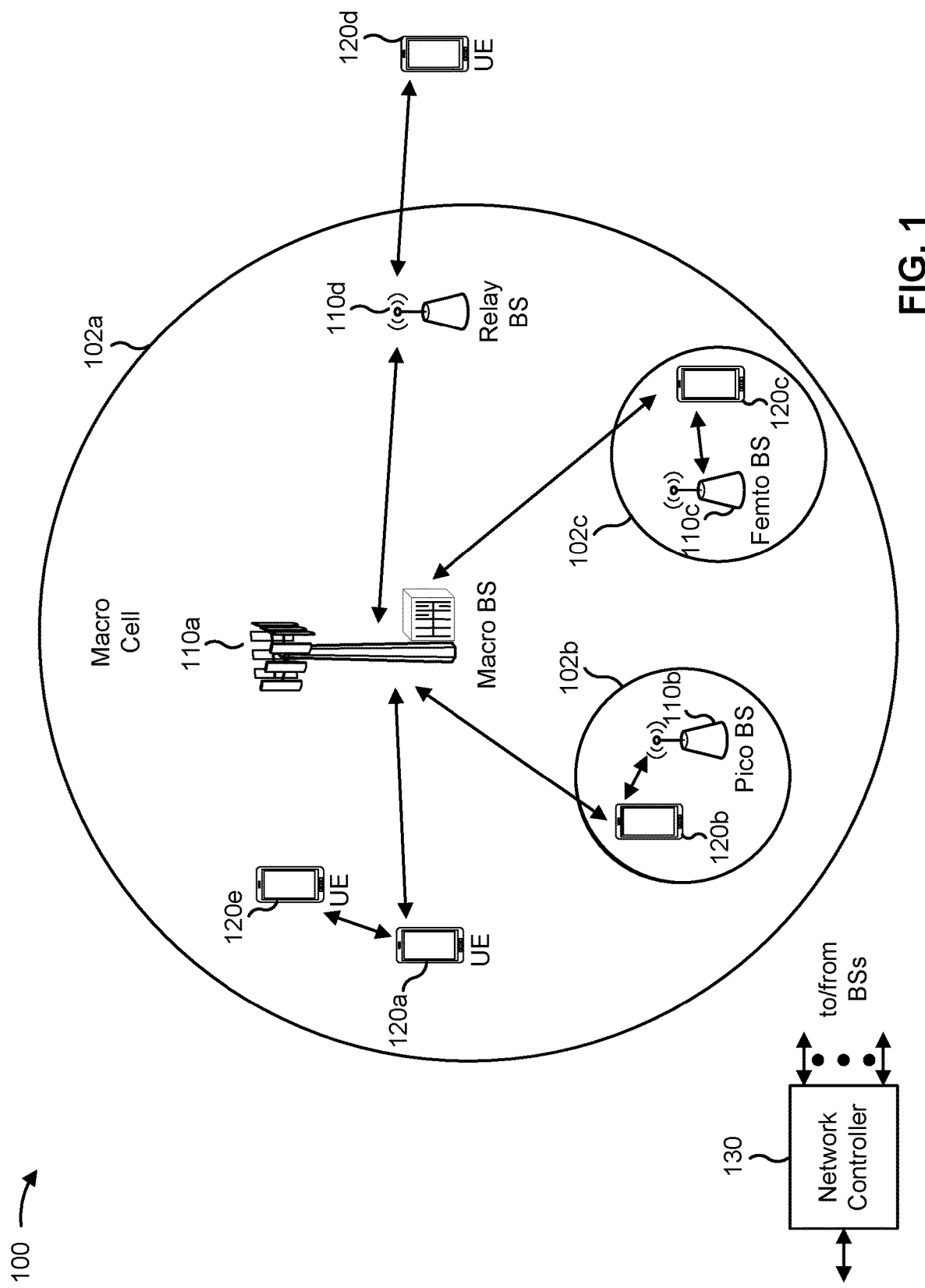
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies or as a third frequency range (FR3). Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). In some aspects, devices of wireless network 100 may communicate using an operating band having a fourth frequency range (FR4), which may span from 52 GHz to 115 GHz. The devices of wireless network 100 may also communicate using an operating band having frequencies higher than the fourth frequency range. It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
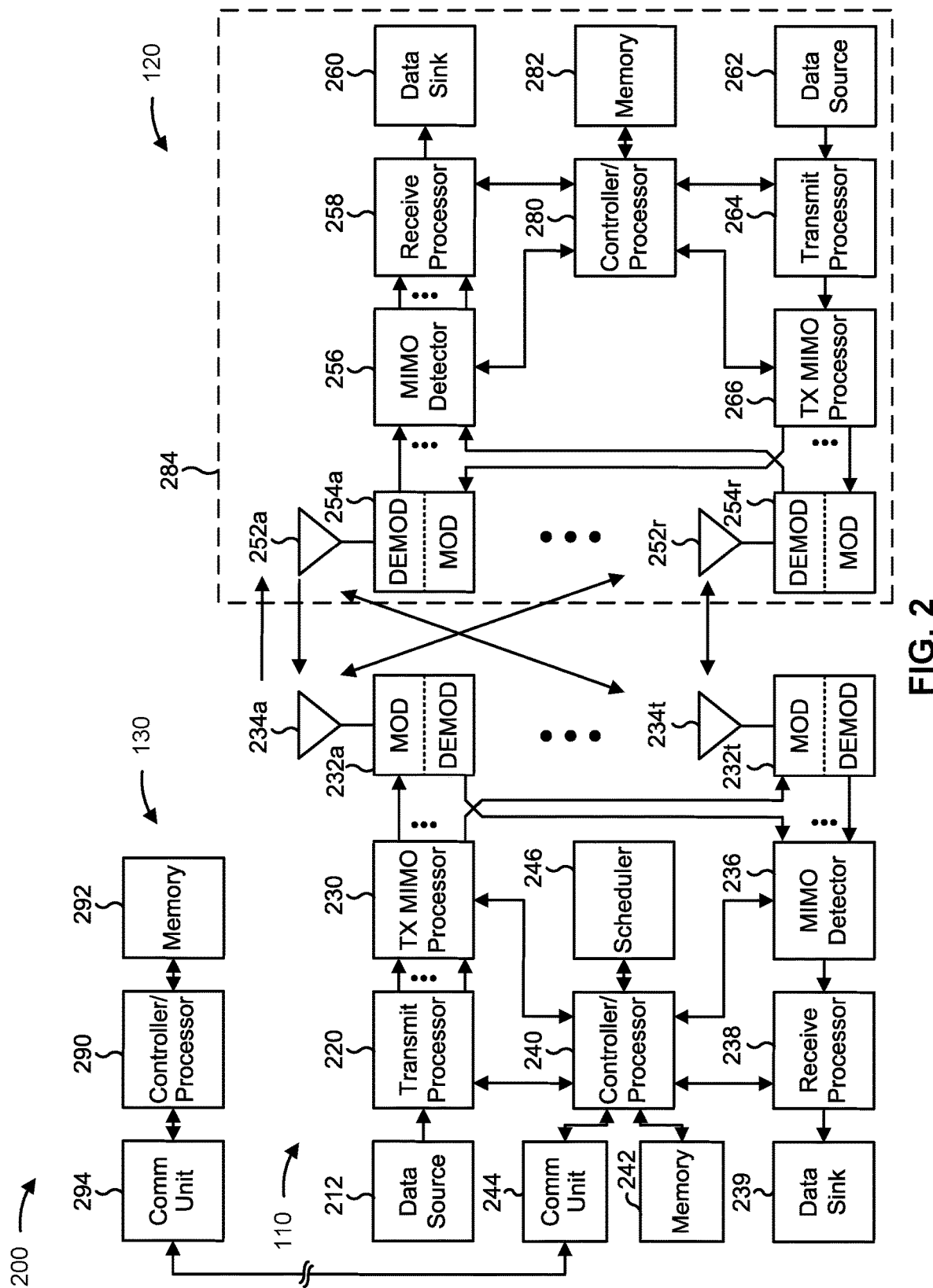
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-9.

Controller/processor 240 of base station 110, controller/processor 280 of UE 120, and/or any other component(s) of FIG. 2 may perform one or more techniques associated with providing a frequency-domain preamble with a time-domain single carrier waveform, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, interpreting the instructions, and/or the like.

In some aspects, UE 120 may include means for receiving, in a slot, a preamble provided based at least in part on an orthogonal frequency division multiplexing (OFDM) waveform, means for performing an estimation operation based at least in part on the preamble, means for receiving, in the slot, a data transmission via a single carrier time domain waveform based at least in part on the estimation operation, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a transmitter (e.g., base station 110) may include means for transmitting, in a slot, a preamble provided based at least in part on an orthogonal frequency division multiplexing (OFDM) waveform, wherein the preamble occupies a first symbol of the slot and a data transmission occupies one or more remaining symbols of the slot, means for transmitting, in the slot, the data transmission via a single carrier time domain waveform, and/or the like. In some aspects, such means may include one or more components of the base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may conduct data communication with a BS via a wireless network such as an LTE network or a 5G/NR network. In the data communication, the UE may receive signaling data (e.g., channel estimation information, such as one or more reference signals) and/or payload data (e.g., audio data, video data, data communications) from the BS. In some aspects, the UE may receive the signaling data and/or the payload data over a channel. The UE may use the channel estimation information received in the signaling data to estimate a condition associated with the channel (e.g., channel estimation).

The UE may utilize frequency-domain waveforms and/or time-domain single carrier waveforms to receive the signaling data and/or the payload data. In a frequency-domain OFDM waveform, multiple orthogonal subcarrier signals with overlapping spectra are transmitted to carry data in parallel. In a single-carrier waveform, multiple symbols in the frequency domain are transformed to and transmitted in the time domain on a single carrier, with the information of each symbol being spread across the entire frequency band. In some instances, utilization of the single carrier waveforms may be preferred over utilization of the frequency-domain waveforms. For example, by utilizing the single carrier waveforms, the UE may avoid performing power-consuming communication operations (e.g., Fast-Fourier Transform (FFT) calculations and inverse FFT (IFFT) calculations) used to process the frequency-domain waveforms. Also, by utilizing the single carrier waveforms, the UE may avoid including an ability (e.g., processing capacity) to perform the power-consuming communication operations, thereby reducing a cost associated with components (e.g., baseband components) of the UE.

While utilizing the single carrier waveforms, the UE may encounter inter-symbol interference during reception, thereby rendering the channel estimation resource-intensive. Also, to utilize the single carrier waveforms, a receiver of the UE may include a complex multi-tap equalizer to process the single carrier waveforms, thereby increasing a cost associated with the receiver of the UE. Furthermore, some channel conditions may change rapidly (e.g., from slot to slot), which may lead to diminished throughput and degraded communication performance.

Various aspects of techniques and apparatuses described herein may provide a frequency-domain preamble with a time-domain single carrier waveform. In some aspects, a UE may utilize a frequency-domain preamble to receive signaling data while utilizing a single carrier waveform to receive payload data. The frequency-domain preamble may be provided based at least in part on an orthogonal frequency division multiplexing (OFDM) waveform. In some aspects, the UE may receive an OFDM preamble including signaling data, perform an estimation operation based at least in part on the signaling data included in the OFDM preamble, and receive a data transmission via a single carrier waveform based at least in part on the estimation operation.

The OFDM preamble may include a cyclic prefix. In some aspects, the cyclic prefix may serve as a guard interval to alleviate potential inter-symbol interference observed at the UE, thereby simplifying channel estimation operations. The OFDM preamble may also enable encoding and/or decoding of the signaling data in the frequency-domain, thereby allowing the UE to utilize a simplified receiver design including, for example, a single-tap equalizer to receive the signaling data. Utilization of the OFDM preamble, which may be provided in one or more slots received during data communication, may provide the UE with a flexibility to adjust to frequent variations in conditions of a channel. In this way, data communication in a network may be improved by providing an OFDM preamble to receive the signaling data with a single carrier waveform to receive the payload data.

Figure 3:
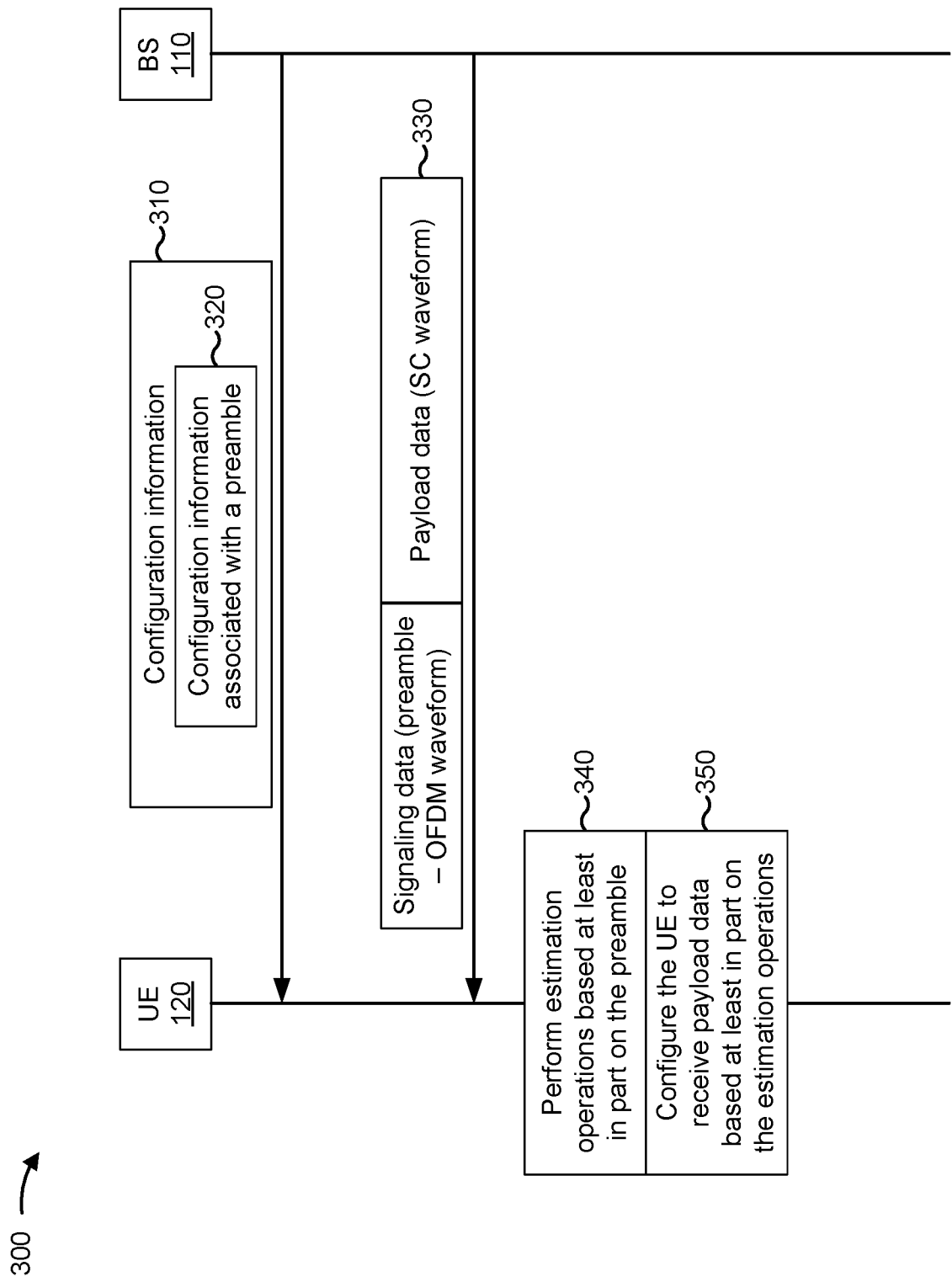
FIG. 3 is a diagram illustrating an example of data communication utilizing an OFDM preamble, in accordance with various aspects of the present disclosure.

FIG. 3 is a diagram illustrating an example 300 of data communication utilizing an OFDM preamble, in accordance with various aspects of the present disclosure. FIG. 3 shows a BS 110 and a UE 120 conducting data communication via a wireless network, such as an LTE network or a 5G/NR network. The data communication may include downlink communications from the BS 110 to the UE 120 and/or uplink communications from the UE 120 to the BS 110. The uplink and downlink communications may include, for example, signaling data and/or payload data.

As shown by reference number 310, the BS 110 may transmit, and the UE 120 may receive, configuration information at a beginning of and/or during the data communication. In some aspects, the UE 120 may receive the configuration information from another device (e.g., from another base station or another UE). In some aspects, the UE 120 may receive the configuration information via, for example, RRC signaling and/or medium access control (MAC) signaling (e.g., MAC control elements (MAC CEs)).

In some aspects, the configuration information may include an indication of, for example, one or more configuration parameters for the UE 120 to use to configure the UE 120 for the data communication. For instance, as shown by reference number 320, the configuration information may include configuration information associated with a preamble. In some aspects, the configuration information associated with the preamble may include, for example, a numerology indicating one or more parameters associated with the preamble. Such parameters may include, for example, a periodicity (T_preamble) of the preamble indicating a periodic interval at which the preamble may be received at the UE 120, a frequency width indicating a subcarrier spacing (SCS) used to transmit the preamble, a sequence length (N_preamble) indicating a length of a pilot sequence included in the preamble, a cyclic prefix (CP) length attached to the preamble, and/or the like.

As shown by reference number 330, to conduct the data communication, the BS 110 may transmit, and the UE 120 may receive, the signaling data via the preamble utilizing an OFDM waveform and the payload data utilizing a single carrier (SC) waveform. The signaling data may include channel estimation information, such as one or more reference signals. The UE may use the channel estimation information to estimate a condition associated with the channel (e.g., channel estimation).

In some aspects, frequency portions of the channel estimation information may be encoded, as encoded channel estimation information, in the preamble, and may be represented by the following equation:

$$p\_t(k)=1/\sqrt{2}((1-2c\_t(2k))+j(1-2c\_t(2k+1))), \text{wherein}$$

p_t(k) is a symbol associated with the preamble for a transmit antenna t at a frequency bin k, and c_t(k) is a Gold sequence for the transmit antenna t that is provided using an initialization defined by c_init(t, N_slot), with N_slot being a slot index. The frequency bin be based at least in part on the frequency width of a subcarrier (e.g., 120 kHz, 480 kHz, 960 kHz, 1.92 MHz, 3.84 MHz, 7.68 MHz, 15.36 MHz, 30.72 MHz, and so on). The frequency width may also be referred to as a subcarrier spacing (SCS). In some aspects, a product of the frequency width and a symbol length may be a constant value. As such, a wider frequency width may result in a proportionately shorter symbol length and a shorter frequency width may result in a proportionately lengthier symbol. Generally, a reference to a "symbol" herein should be understood to refer to an OFDM symbol.

As shown by reference number 340, the UE 120 may perform one or more estimation operations based at least in part on the preamble. For instance, the UE 120 may perform estimation operations based at least in part on the signaling data included in the preamble. In some aspects, the UE 120 may perform the estimation operations to estimate channel conditions to facilitate the data communication. For instance, the UE 120 may use the encoded channel estimation information, associated with a given transmit antenna t and a given frequency bin k, to perform the channel estimation. The channel estimation may include estimating, based at least in part on the encoded channel estimation information, a time-varying frequency response (e.g., fading) associated with the channel.

In some aspects, based at least in part on other signaling data included in the preamble, the UE 120 may perform additional estimation operations to estimate one or more short-term parameters. Such estimation operations may include, for example, a timing estimation, a noise covariance estimation, and/or the like. The timing estimation may provide the UE 120 with timing information to synchronize with the BS 110. The noise covariance estimation may provide the UE 120 with information about a variance in an amount of noise observed over a channel used for the data communication. In this way, the UE 120 may use signaling data to estimate multiple short-term channel conditions, thereby providing the UE 120 with flexibility to adjust to frequent variations in conditions of the channel.

As shown by reference number 350, the UE 120 may configure the UE 120 to receive the payload data based at least in part on the one or more estimation operations. For instance, with respect to the channel estimation, based at least in part on a characteristic of an estimated time-varying frequency response, the UE 120 may calculate an equalization response by, for example, inverting the characteristic of the estimated time-varying frequency response. The equalization response may enable the UE 120 to equalize the frequency portions of the channel estimation information, and to receive and decode the payload data. Also, based at least in part on the additional estimation operations, the UE 120 may estimate the one or more short-term parameters and configure the UE 120 to receive and decode the payload data.

In some aspects, the UE 120 may receive the preamble periodically. For instance, as discussed in further detail with respect to FIG. 4, the UE 120 and the BS 110 may conduct the data communication utilizing one or more slots, and the UE 120 may receive the preamble once within a predetermined number of slots (e.g., every slot, every N slots where N is an integer greater than 1). By periodically receiving the preamble, and the included signaling data, the UE 120 may periodically estimate the one or more short-term parameters and adjust a configuration of the UE 120 to receive the payload data without delay or degradation. In this way, efficiency and operation of the wireless network may be improved.

As indicated above, FIG. 3 is provided as an example. Other examples may differ from what is described with regard to FIG. 3.

Figure 4:
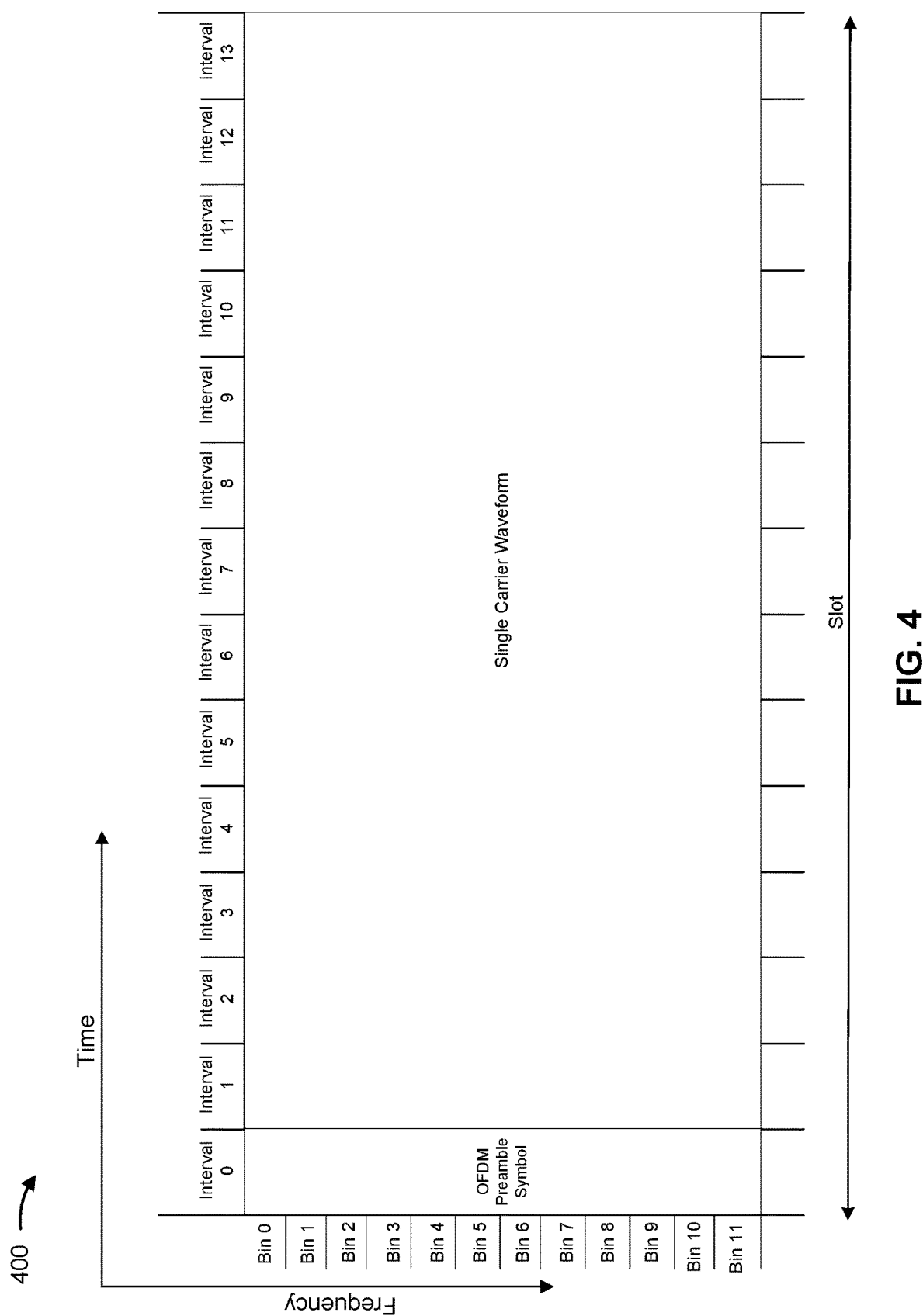
FIG. 4 is a diagram illustrating an example of data communication utilizing an OFDM preamble, in accordance with various aspects of the present disclosure.

FIG. 4 is a diagram illustrating an example 400 of data communication utilizing an OFDM preamble, in accordance with various aspects of the present disclosure.

In some aspects, a BS 110 and a UE 120 may conduct a data communication, in a wireless network, by transmitting and/or receiving signaling data and/or payload data. For instance, during the data communication, the UE 120 may receive the signaling data utilizing an OFDM preamble and may receive the payload data utilizing a single carrier waveform. The OFDM preamble may include, for example, one or more preambles discussed elsewhere herein, such as the preamble discussed above with respect to FIG. 3.

In some aspects, the BS 110 and the UE 120 may transmit and/or receive the signaling data and/or the payload data utilizing one or more slots. A slot may contain any combination of, for example, the OFDM preamble including the signaling data, the single carrier waveform including the payload data, and/or a DL/UL gap used, for example, to separate downlink and uplink communications. In some aspects, the UE 120 may receive an OFDM preamble periodically (e.g., once within a periodic interval of time, such as once per slot or once per a predetermined number of slots).

FIG. 4 shows an example of a slot containing an OFDM preamble including signaling data and a single carrier waveform including payload data. In some aspects, the UE 120 may receive the OFDM preamble including one or more symbols associated with a frequency-domain OFDM waveform (OFDM preamble symbol) and may receive the single carrier waveform as a time-domain waveform. As shown in FIG. 4, the OFDM preamble symbol and the single carrier waveform may be arranged in the slot with, for example, time charted along an x-axis and frequency charted along a y-axis. In some aspects, the time along the x-axis of the slot may be divided into, for example, fourteen time intervals (e.g., Interval 0, Interval 1, . . . , Interval 12, and Interval 13) and the frequency along the y-axis may be divided into, for example, 12 frequency bins (e.g., Bin 0, Bin 1, . . . , Bin 10, and Bin 11). The UE 120 may receive the OFDM preamble symbol during, for example, Interval 0 and may receive the single carrier waveform during, for example, a time span from Interval 1 to Interval 13. In some aspects, the time intervals may correspond to symbols.

As discussed above with respect to FIG. 3, the OFDM preamble may include signaling data (e.g., encoded channel estimation information) and the UE 120 may perform one or more estimation operations to estimate short-term channel conditions. Such estimation of the multiple short-term channel conditions may provide the UE 120 with flexibility to adjust to frequent variations in conditions of a channel used for data communication. In some aspects, as shown in FIG. 4, the UE 120 may receive a single OFDM preamble symbol within a given slot (e.g., within Interval 0) and may use a remainder of the slot (e.g., Interval 1 through Interval 13) to receive payload data. In this way, a data throughput enabled by the UE 120 and operation of the network may be improved.

In some aspects, the slot may have a different arrangement than what is shown in FIG. 4. For example, the slot may include a plurality of OFDM preamble symbols. In other words, the single OFDM preamble symbol at Interval 0 may be one of the plurality of OFDM preamble symbols in the slot (e.g., the plurality of OFDM preamble symbols may be adjacent or non-adjacent symbols within the slot). As another example, the slot may include the single OFDM preamble symbol within an interval of the slot other than a first interval of the slot.

As indicated above, FIG. 4 is provided as an example. Other examples may differ from what is described with regard to FIG. 4.

Figure 5:
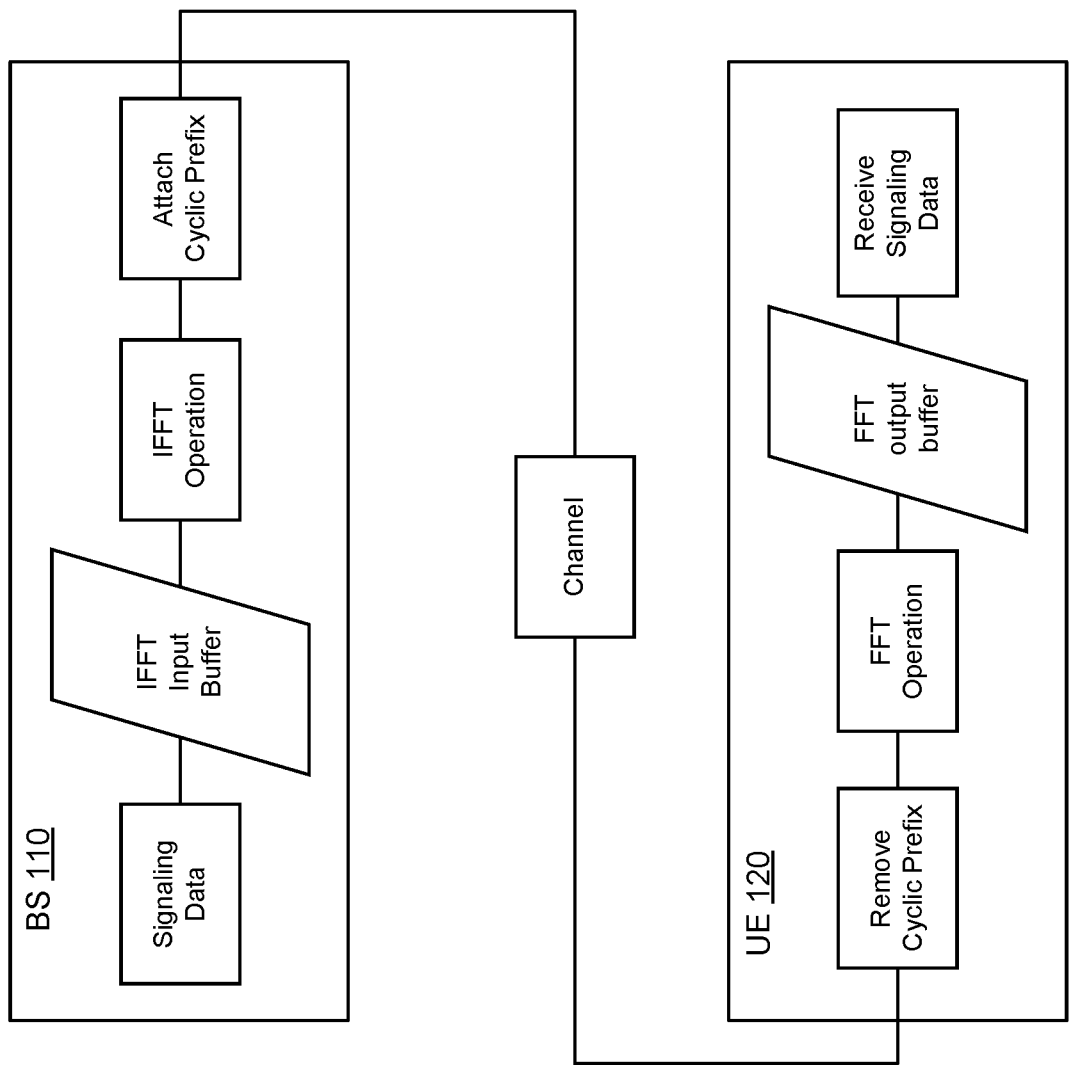
FIG. 5 is a diagram illustrating an example of data communication utilizing an OFDM preamble, in accordance with various aspects of the present disclosure.

FIG. 5 is a diagram illustrating an example 500 of data communication utilizing an OFDM preamble, in accordance with various aspects of the present disclosure. A BS 110 and a UE 120 may conduct data communication, in a wireless network, by transmitting and/or receiving signaling data and/or payload data. In some aspects, the BS 110 may transmit, and the UE 120 may receive, the signaling data utilizing a frequency-domain OFDM preamble and/or the payload data utilizing a single carrier waveform. In some aspects, the UE 120 may receive the OFDM preamble periodically (e.g., once within a periodic interval of time, such as once per slot or once per a predetermined number of slots). The OFDM preamble may include, for example, one or more preambles discussed elsewhere herein, such as the preamble discussed above with respect to FIG. 3 and/or the OFDM preamble discussed above with respect to FIG. 4.

As shown in FIG. 5, the BS 110 may process signaling data, to be transmitted to the UE 120, by inputting the signaling data into an inverse Fast-Fourier transform (IFFT) input buffer. An IFFT operation may be performed on the output of the IFFT input buffer to provide the OFDM preamble. The BS 110 may attach a cyclic prefix to the OFDM preamble and transmit the OFDM preamble over a channel to the UE 120. Upon reception of the preamble, the UE 120 may remove the cyclic prefix attached to the OFDM preamble, perform a Fast-Fourier Transform (FFT) operation on the OFDM preamble, and provide an output of the FFT operation to an FFT output buffer to receive the signaling data.

In some aspects, the channel may introduce inter-symbol interference (ISI) to a transmission of the OFDM preamble resulting in ISI potentially being observed at the UE 120. The cyclic prefix may serve as a guard interval to alleviate potential ISI observed at the UE 120, thereby allowing the UE 120 to receive the OFDM preamble without degradation. In some aspects, a cyclic prefix length (CP length) of the cyclic prefix attached to the frequency-domain OFDM preamble may be shorter than a CP length of a cyclic prefix attached to frequency-domain signals used for communications in the FR1 and/or FR2 frequency ranges of a 5G network. As one example, the shorter CP length may be approximately 1-2% of a symbol, whereas the longer CP length may be approximately 7% of a symbol. A shorter CP length may allow inclusion of, for example, more payload data, thereby increasing an amount of throughput enabled by the UE 120. In some aspects, the shorter CP length may provide flexibility in selecting a subcarrier spacing (SCS) associated with the OFDM preamble.

In this way, by utilizing the cyclic prefix to receive the OFDM preamble, and the included signaling data, operation of the wireless network may be improved.

As indicated above, FIG. 5 is provided as an example. Other examples may differ from what is described with regard to FIG. 5.

Figure 6:
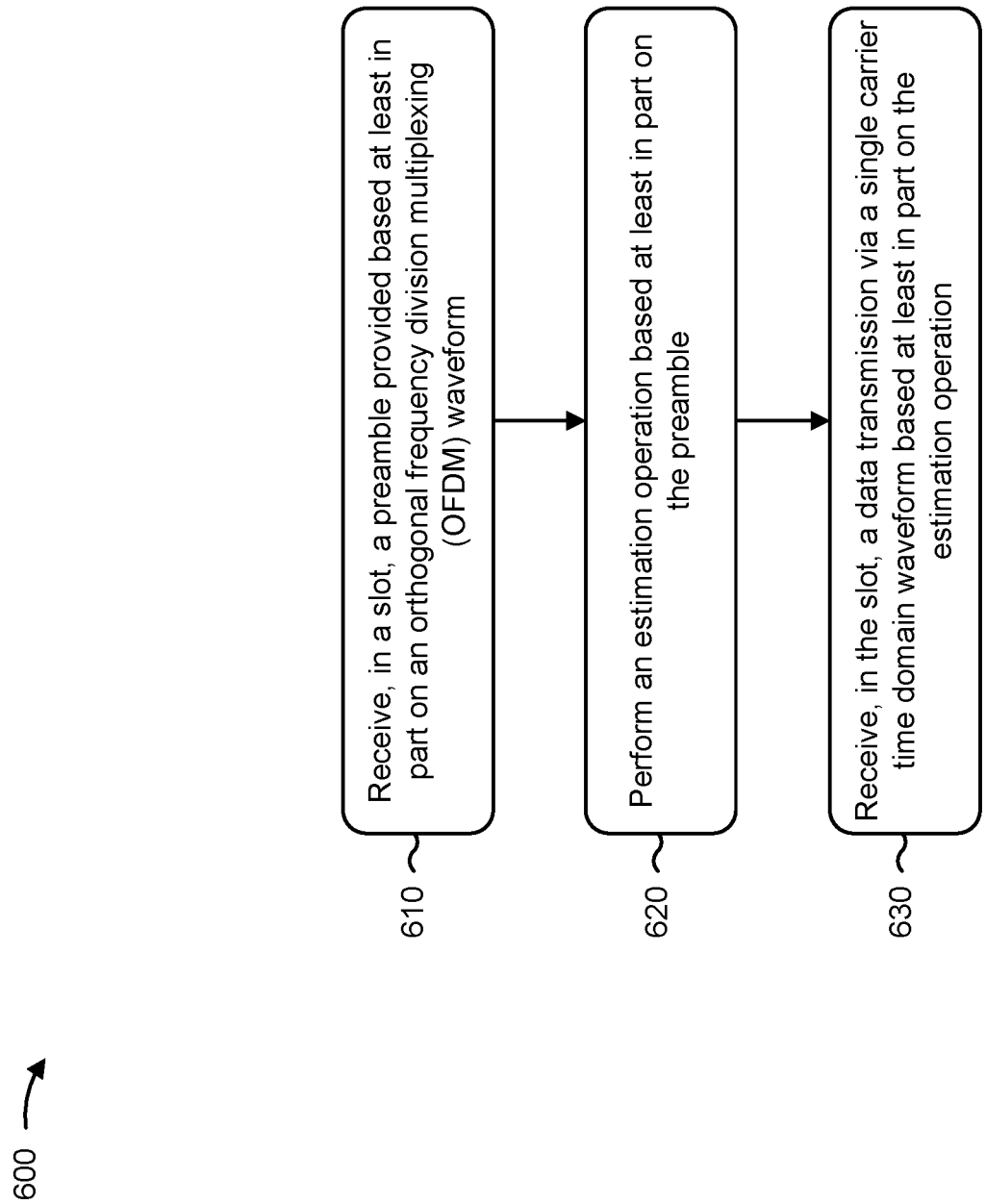
FIGS. 6-7 are diagrams illustrating example processes associated with data communication utilizing an OFDM preamble, in accordance with various aspects of the present disclosure.

FIG. 6 is a diagram illustrating an example process 600 associated with data communication utilizing an OFDM preamble, in accordance with various aspects of the present disclosure. In some aspects, example process 600 may be performed by, for example, a user equipment (UE) (e.g., UE 120). Example process 600 is an example where the UE performs operations associated with providing a frequency-domain preamble with a time-domain single carrier waveform.

As shown in FIG. 6, in some aspects, process 600 may include receiving, in a slot, a preamble provided based at least in part on an orthogonal frequency division multiplexing (OFDM) waveform (block 610). For example, the UE (e.g., using reception component 802, depicted in FIG. 8) may receive, in a slot, a preamble provided based at least in part on an OFDM waveform, as described above.

As further shown in FIG. 6, in some aspects, process 600 may include performing an estimation operation based at least in part on the preamble (block 620). For example, the UE (e.g., using estimation component 808, depicted in FIG. 8) may perform an estimation operation based at least in part on the preamble, as described above.

As further shown in FIG. 6, in some aspects, process 600 may include receiving, in the slot, a data transmission via a single carrier time domain waveform based at least in part on the estimation operation (block 630). For example, the UE (e.g., using reception component 802, depicted in FIG. 8) may receive, in the slot, a data transmission via a single carrier time domain waveform based at least in part on the estimation operation, as described above.

Process 600 may include additional aspects, such as any single aspect or any combination of aspects described below and/or in connection with one or more other processes described elsewhere herein.

In a first aspect, the preamble occupies a first symbol of the slot and the data transmission occupies one or more remaining symbols of the slot.

In a second aspect, the one or more remaining symbols comprise all symbols in the slot not occupied by the preamble.

In a third aspect, alone or in combination with one or more of the first and second aspects, the preamble is associated with a cyclic prefix.

In a fourth aspect, alone or in combination with one or more of the first through third aspects, process 600 includes receiving configuration information indicating a configuration for the preamble, wherein the estimation operation is based at least in part on the configuration information.

In a fifth aspect, the configuration information indicates a numerology for the preamble.

In a sixth aspect, alone or in combination with one or more of the first through fifth aspects, the preamble, in a slot, is defined based at least in part on a frequency bin index, a root sequence, and a slot index of the slot.

In a seventh aspect, alone or in combination with one or more of the first through sixth aspects, the preamble is defined, in a slot and for a transmit antenna t at a frequency bin k, by an expression: $p\_t(k)=1/\sqrt{2}((1-2c\_t(2k))+j(1-2c\_t(2k+1)))$, wherein $p\_t(k)$ is a preamble symbol for the transmit antenna t at the frequency bin k, $c\_t(k)$ is a sequence for the transmit antenna t that is provided using an initialization that is defined by $c\_init(t, N\_slot)$, and $N\_slot$ is a slot index of the slot.

In an eighth aspect, alone or in combination with one or more of the first through seventh aspects, the estimation operation includes at least one of channeling estimation, timing estimation, or noising covariance estimation.

In a ninth aspect, alone or in combination with one or more of the first through eighth aspects, the slot is a first slot, wherein the estimation operation is performed for the first slot, and wherein the method further comprises receiving the preamble in a second slot, and performing the estimation operation for the second slot.

In a tenth aspect, alone or in combination with one or more of the first through ninth aspects, the preamble is received once per slot that includes data transmitted via a single carrier waveform.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
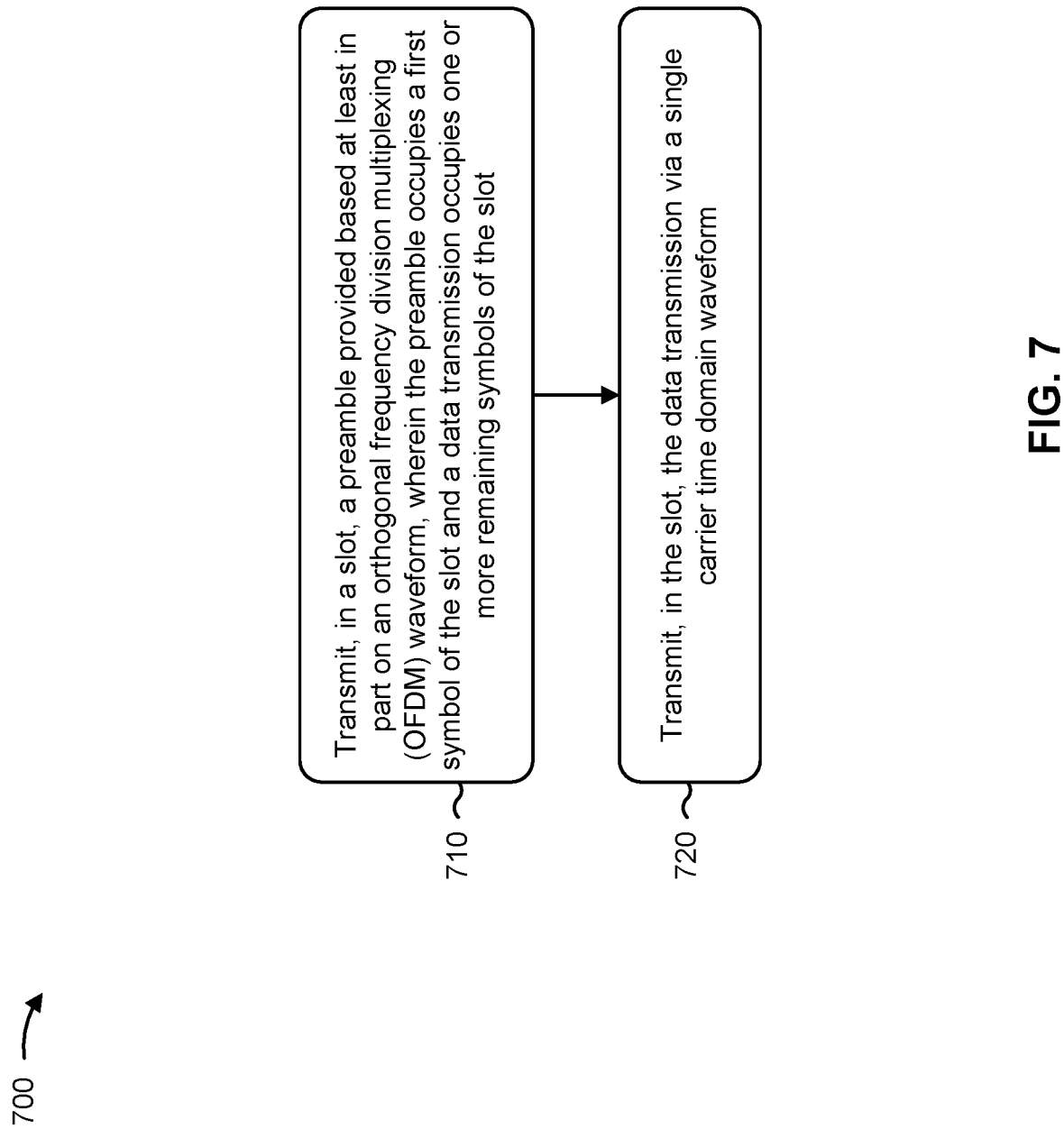

FIG. 7 is a diagram illustrating an example process 700 associated with data communication utilizing an OFDM preamble, in accordance with various aspects of the present disclosure. In some aspects, example process 700 may be performed by, for example, a transmitter (e.g., BS 110). Example process 700 is an example where the transmitter performs operations associated with providing a frequency-domain preamble with a time-domain single carrier waveform.

As shown in FIG. 7, in some aspects, process 700 may include transmitting, in a slot, a preamble provided based at least in part on an orthogonal frequency division multiplexing (OFDM) waveform, wherein the preamble occupies a first symbol of the slot and a data transmission occupies one or more remaining symbols of the slot (block 710). For example, the transmitter (e.g., using transmission component 904, depicted in FIG. 9) may transmit, in a slot, a preamble provided based at least in part on an OFDM waveform, wherein the preamble occupies a first symbol of the slot and a data transmission occupies one or more remaining symbols of the slot, as described above.

As further shown in FIG. 7, in some aspects, process 700 may include transmitting, in the slot, the data transmission via a single carrier time domain waveform (block 720). For example, the transmitter (e.g., using transmission component 904, depicted in FIG. 9) may transmit, in the slot, the data transmission via a single carrier time domain waveform, as described above. The transmitter may also include a reception component 902 to receive communications.

Process 700 may include additional aspects, such as any single aspect or any combination of aspects described below and/or in connection with one or more other processes described elsewhere herein.

In a first aspect, the one or more remaining symbols comprise all symbols in the slot not occupied by the preamble.

In a second aspect, alone or in combination with the first aspect, the preamble is associated with a cyclic prefix.

In a third aspect, alone or in combination with one or more of the first and second aspects, process 700 includes transmitting configuration information indicating a configuration for the preamble. In some aspects, the transmitter may include a configuration component 908, depicted in FIG. 9, to provide the configuration for the preamble.

In a fourth aspect, alone or in combination with one or more of the first through third aspects, the configuration information indicates a numerology for the preamble.

In a fifth aspect, alone or in combination with one or more of the first through fourth aspects, the preamble, in a slot, is defined based at least in part on a frequency bin index, a root sequence, and a slot index of the slot.

In a sixth aspect, alone or in combination with one or more of the first through fifth aspects, the preamble is defined, in a slot and for a transmit antenna t at a frequency bin k, by an expression: $p\_t(k)=1/\sqrt{2}((1-2c\_t(2k))+j(1-2c\_t(2k+1)))$, wherein $p\_t(k)$ is a preamble symbol for the transmit antenna t at the frequency bin k, $c\_t(k)$ is a sequence for the transmit antenna t that is provided using an initialization that is defined by $c\_init(t, N\_slot)$, and $N\_slot$ is a slot index of the slot.

In a seventh aspect, alone or in combination with one or more of the first through sixth aspects, the preamble is transmitted once per each slot that includes data transmitted via a single carrier waveform.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
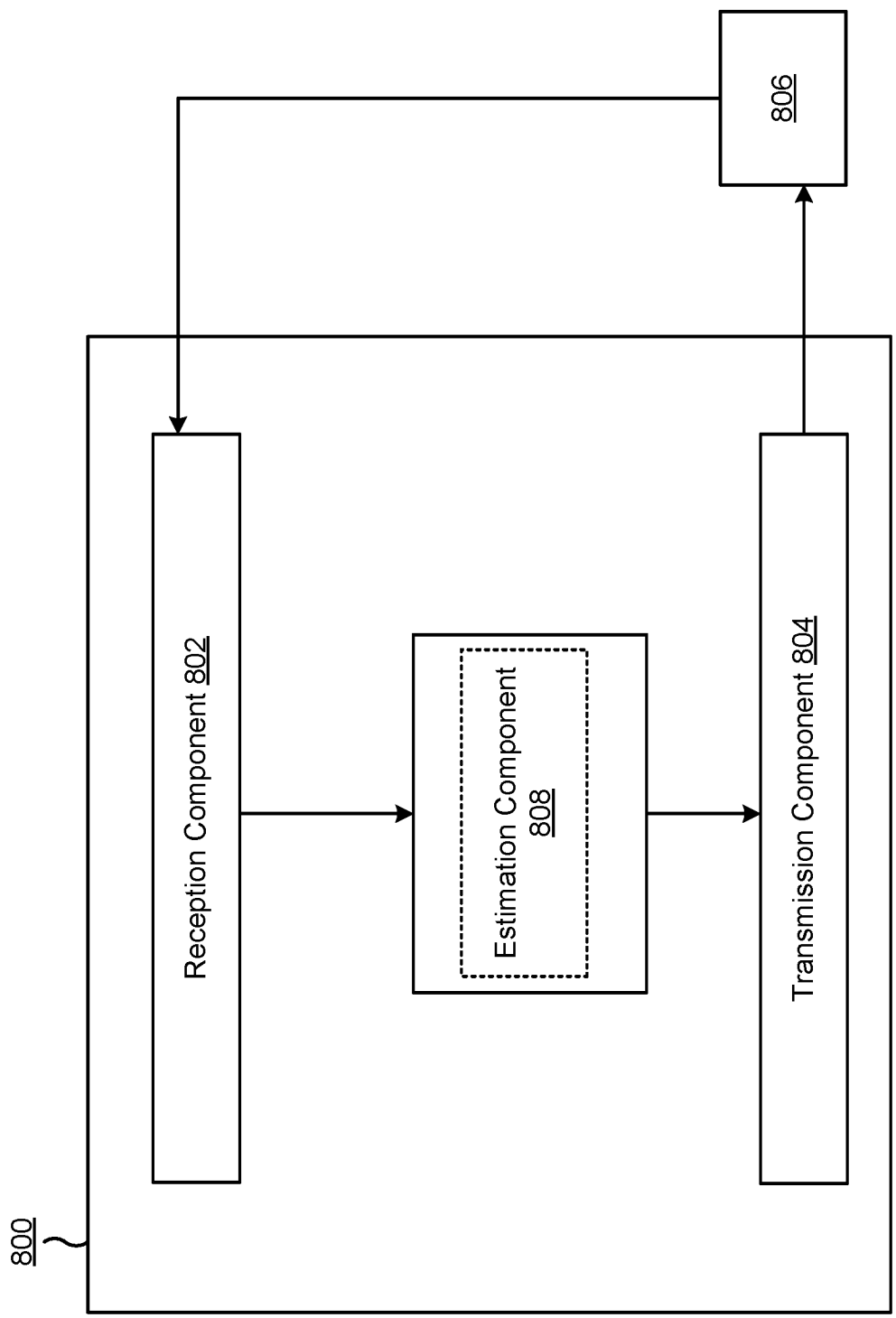
FIGS. 8-9 are block diagrams of example apparatuses associated with data communication utilizing an OFDM preamble, in accordance with various aspects of the present disclosure.

FIG. 8 is a block diagram of an example apparatus 800 associated with data communication utilizing an OFDM preamble, in accordance with various aspects of the present disclosure. The apparatus 800 may be a user equipment (UE), or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of an estimation component 808, among other examples.

In some aspects, the apparatus 800 may be configured to perform one or more operations described herein in connection with FIGS. 3-5. Additionally or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be collocated with the reception component 802 in a transceiver.

The reception component 802 may receive, in a slot, a preamble provided based at least in part on an orthogonal frequency division multiplexing (OFDM) waveform. The estimation component 808 may perform an estimation operation based at least in part on the preamble. In some aspects, the estimation component 808 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The reception component 802 may receive, in the slot, a data transmission via a single carrier time domain waveform based at least in part on the estimation operation.

The reception component 802 may receive configuration information indicating a configuration for the preamble, wherein the estimation operation is based at least in part on the configuration information. The reception component 802 may receive the preamble in a second slot; and the estimation component 808 may perform the estimation operation for the second slot.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
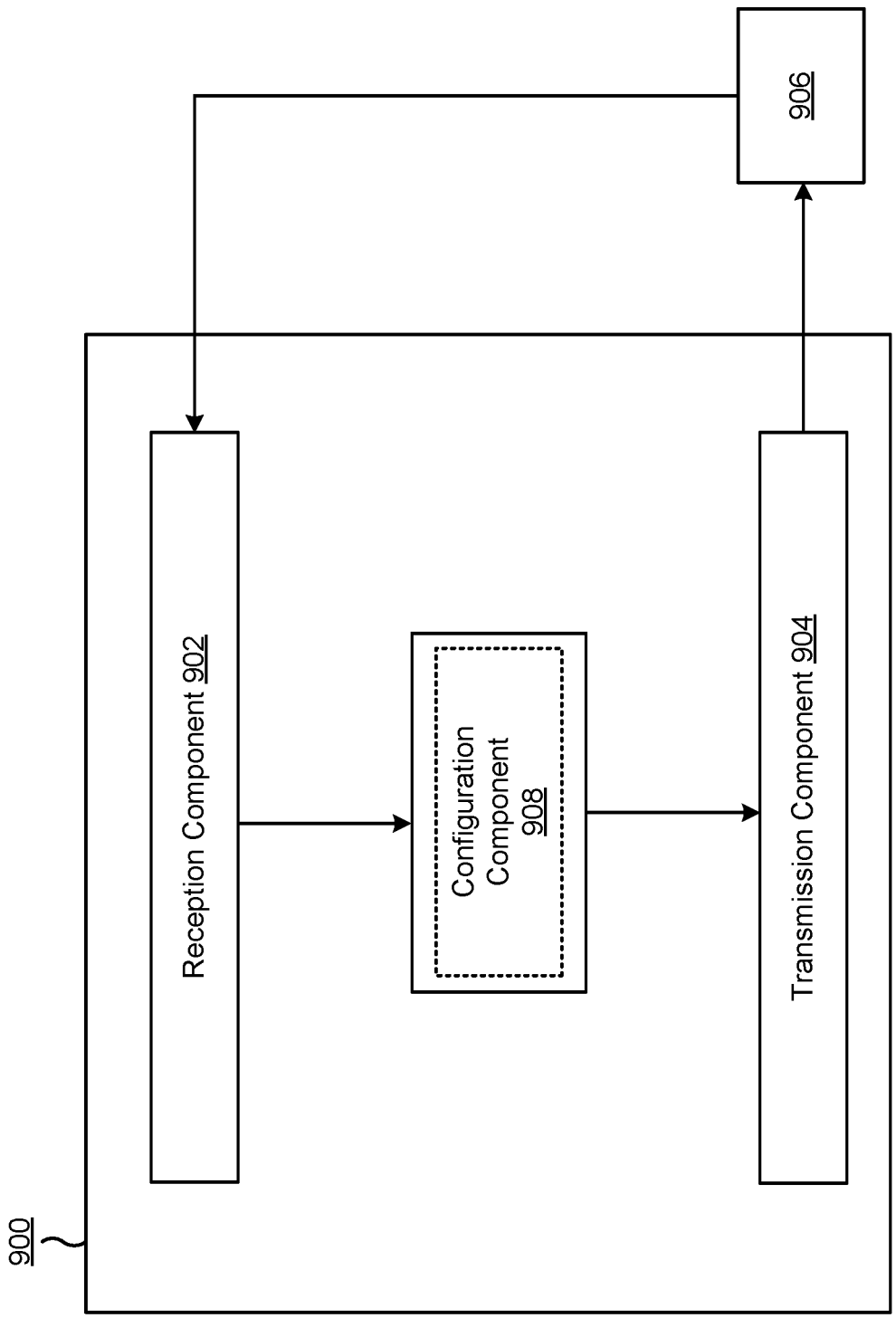

FIG. 9 is a block diagram of an example apparatus 900 associated with data communication utilizing an OFDM preamble, in accordance with various aspects of the present disclosure. The apparatus 900 may be a transmitter, or a transmitter may include the apparatus 900. In some aspects, the transmitter may be a base station discussed elsewhere herein such as, for example, the BS 110 described with respect to FIG. 2. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a configuration component 908, among other examples.

In some aspects, the apparatus 900 may be configured to perform one or more operations described herein in connection with FIGS. 3-5. Additionally or alternatively, the apparatus 900 may be configured to perform one or more processes described herein, such as process 700 of FIG. 7. In some aspects, the apparatus 900 and/or one or more components shown in FIG. 9 may include one or more components of the transmitter described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the transmitter described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the transmitter described above in connection with FIG. 2. In some aspects, the transmission component 904 may be collocated with the reception component 902 in a transceiver.

The transmission component 904 may transmit, in a slot, a preamble provided based at least in part on an orthogonal frequency division multiplexing (OFDM) waveform, wherein the preamble occupies a first symbol of the slot and a data transmission occupies one or more remaining symbols of the slot. In some aspects, the configuration component 908 may configure the information included in the preamble. In some aspects, the configuration component 908 may include one or more antennas, a demodulator, a MIMO detector, a receive processor, a modulator, a transmit MIMO processor, a transmit processor, a control/processor, a memory, or a combination thereof of the BS 110 described above in connection with FIG. 2. The transmission component 904 may transmit, in the slot, the data transmission via a single carrier time domain waveform. The transmission component 904 may transmit configuration information indicating a configuration for the preamble.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The following provides an overview of aspects of the present disclosure:

Aspect 1: A method of wireless communication performed by a user equipment (UE), comprising: receiving, in a slot, a preamble generated based at least in part on an orthogonal frequency division multiplexing (OFDM) waveform; performing an estimation operation based at least in part on the preamble; and receiving, in the slot, a data transmission via a single carrier time domain waveform.

Aspect 2: The method of aspect 1, wherein the preamble occupies a first OFDM symbol of the slot and the data transmission occupies one or more remaining symbols of the slot.

Aspect 3: The method of aspect 2, wherein the one or more remaining symbols comprise all symbols in the slot not occupied by the preamble.

Aspect 4: The method of any of aspects 1-3, wherein the preamble is associated with a cyclic prefix.

Aspect 5: The method of any of aspects 1-4, further comprising receiving configuration information indicating a configuration for the preamble, wherein the estimation operation is based at least in part on the configuration information.

Aspect 6: The method of aspect 5, wherein the configuration information indicates a numerology for the preamble.

Aspect 7: The method of aspect 5, wherein the preamble, in a slot, is defined based at least in part on a frequency bin index, a root sequence, and a slot index of the slot.

Aspect 8: The method of aspect 5, wherein the preamble is defined, in a slot and for a transmit antenna t at a frequency bin k, by an expression:

$$p\_t(k)=1/\sqrt{2}((1-2c\_t(2k))+j(1-2c\_t(2k+1))), \text{ wherein:}$$

p_t(k) is a preamble symbol for the transmit antenna t at the frequency bin k, c_t(k) is a sequence for the transmit antenna t that is provided using an initialization that is defined by c_init(t, N_slot), and N_slot is a slot index of the slot.

Aspect 9: The method of any of aspects 1-8, wherein the estimation operation includes at least one of: channel estimation, timing estimation, or noise covariance estimation.

Aspect 10: The method of any of aspects 1-9, wherein the slot is a first slot, wherein the estimation operation is performed for the first slot, and wherein the method further comprises: receiving the preamble in a second slot; and performing the estimation operation for the second slot.

Aspect 11: The method of any of aspects 1-10, wherein the preamble is received once per slot that includes data transmitted via a single carrier waveform.

Aspect 12: A method of wireless communication performed by a transmitter, comprising: transmitting, in a slot, a preamble provided based at least in part on an orthogonal frequency division multiplexing (OFDM) waveform, wherein the preamble occupies a first OFDM symbol of the slot and a data transmission occupies one or more remaining symbols of the slot; and transmitting, in the slot, the data transmission via a single carrier time domain waveform.

Aspect 13: The method of aspect 12, wherein the one or more remaining symbols comprise all symbols in the slot not occupied by the preamble.

Aspect 14: The method of any of aspects 12-13, wherein the preamble is associated with a cyclic prefix.

Aspect 15: The method of any of aspects 12-14, further comprising transmitting configuration information indicating a configuration for the preamble.

Aspect 16: The method of aspect 15, wherein the configuration information indicates a numerology for the preamble.

Aspect 17: The method of any of aspects 12-16, wherein the preamble, in a slot, is defined based at least in part on a frequency bin index, a root sequence, and a slot index of the slot.

Aspect 18: The method of any of aspects 12-17, wherein the preamble is defined, in a slot and for a transmit antenna t at a frequency bin k, by an expression:

$$p\_t(k)=1/\sqrt{2}((1-2c\_t(2k))+j(1-2c\_t(2k+1))), \text{ wherein:}$$

p_t(k) is a preamble symbol for the transmit antenna t at the frequency bin k, c_t(k) is a sequence for the transmit antenna t that is provided using an initialization that is defined by c_init(t, N_slot), and N_slot is a slot index of the slot.

Aspect 19: The method of any of aspects 12-18, wherein the preamble is transmitted once per each slot that includes data transmitted via a single carrier waveform.

Aspect 20: A device for wireless communication, comprising a memory and one or more processors coupled to the memory, the memory and the one or more processors configured to perform the method of one or more aspects of aspects 1-19.

Aspect 21: An apparatus for wireless communication, comprising at least one means for performing the method of one or more aspects of aspects 1-19.

Aspect 22: A non-transitory computer-readable medium storing a set of instructions for wireless communication, the set of instructions comprising one or more instructions that, when executed by one or more processors of a device, cause the device to perform the method of one or more aspects of aspects 1-19.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        receive, in a slot, a preamble communicated utilizing an orthogonal frequency division multiplexing (OFDM) waveform;
        perform an estimation operation based at least in part on the preamble; and
        receive, in the slot, a data transmission via a single carrier time domain waveform based at least in part on the estimation operation.

2. The UE of claim 1, wherein the preamble occupies a first OFDM symbol of the slot and the data transmission occupies one or more remaining symbols of the slot.

3. The UE of claim 2, wherein the one or more remaining symbols comprise all symbols in the slot not occupied by the preamble.

4. The UE of claim 1, wherein the preamble is associated with a cyclic prefix.

5. The UE of claim 1, wherein the one or more processors are further configured to:
    receive configuration information indicating a configuration for the preamble, wherein the estimation operation is based at least in part on the configuration information.

6. The UE of claim 5, wherein the configuration information indicates a numerology for the preamble.

7. The UE of claim 5, wherein the preamble, in a slot, is defined based at least in part on a frequency bin index, a root sequence, and a slot index of the slot.

8. The UE of claim 5, wherein the preamble is defined, in a slot and for a transmit antenna t at a frequency bin k, by an expression:

$$p\_t(k)=1/\sqrt{2}((1-2c\_t(2k))+j(1-2c\_t(2k+1))), \text{ wherein:}$$

p_t(k) is a preamble symbol for the transmit antenna t at the frequency bin k, c_t(k) is a sequence for the transmit antenna t that is provided using an initialization that is defined by c_init(t, N_slot), and N_slot is a slot index of the slot.

9. The UE of claim 1, wherein the estimation operation includes at least one of:
    channel estimation,
    timing estimation, or
    noise covariance estimation.

10. The UE of claim 1, wherein the slot is a first slot, wherein the estimation operation is performed for the first slot, and wherein the one or more processors are configured to:
receive the preamble in a second slot; and
perform the estimation operation for the second slot.

11. The UE of claim 1, wherein the preamble is received once per slot that includes data transmitted via a single carrier waveform.

12. A transmitter for wireless communication, comprising:
a memory; and
one or more processors, coupled to the memory, configured to:
transmit, in a slot, a preamble communicated utilizing an orthogonal frequency division multiplexing (OFDM) waveform, wherein the preamble occupies a first OFDM symbol of the slot and a data transmission occupies one or more remaining symbols of the slot; and
transmit, in the slot, the data transmission via a single carrier time domain waveform.

13. The transmitter of claim 12, wherein the one or more remaining symbols comprise all symbols in the slot not occupied by the preamble.

14. The transmitter of claim 12, wherein the preamble is associated with a cyclic prefix.

15. The transmitter of claim 12, wherein the one or more processors are further configured to:
transmit configuration information indicating a configuration for the preamble.

16. The transmitter of claim 15, wherein the configuration information indicates a numerology for the preamble.

17. The transmitter of claim 12, wherein the preamble, in a slot, is defined based at least in part on a frequency bin index, a root sequence, and a slot index of the slot.

18. The transmitter of claim 12, wherein the preamble is defined, in a slot and for a transmit antenna t at a frequency bin k, by an expression:

$$p\_t(k)=1/\sqrt{2}((1-2c\_t(2k))+j(1-2c\_t(2k+1))), \text{ wherein:}$$

p_t(k) is a preamble symbol for the transmit antenna t at the frequency bin k,
c_t(k) is a sequence for the transmit antenna t that is provided using an initialization that is defined by c_init(t, N_slot), and
N_slot is a slot index of the slot.

19. The transmitter of claim 12, wherein the preamble is transmitted once per each slot that includes data transmitted via a single carrier waveform.

20. A method of wireless communication performed by a user equipment (UE), comprising:
receiving, in a slot, a preamble communicated utilizing an orthogonal frequency division multiplexing (OFDM) waveform;
performing an estimation operation based at least in part on the preamble; and
receiving, in the slot, a data transmission via a single carrier time domain waveform.

21. The method of claim 20, wherein the preamble occupies a first OFDM symbol of the slot and the data transmission occupies one or more remaining symbols of the slot.

22. The method of claim 21, wherein the one or more remaining symbols comprise all symbols in the slot not occupied by the preamble.

23. The method of claim 21, wherein the preamble is associated with a cyclic prefix.

24. The method of claim 21, further comprising:
receiving configuration information indicating a configuration for the preamble, wherein the estimation operation is based at least in part on the configuration information.

25. The method of claim 24, wherein the configuration information indicates a numerology for the preamble.

26. A method of wireless communication performed by a transmitter, comprising:
transmitting, in a slot, a preamble communicated utilizing an orthogonal frequency division multiplexing (OFDM) waveform, wherein the preamble occupies a first OFDM symbol of the slot and a data transmission occupies one or more remaining symbols of the slot; and
transmitting, in the slot, the data transmission via a single carrier time domain waveform.

27. The method of claim 26, wherein the one or more remaining symbols comprise all symbols in the slot not occupied by the preamble.

28. The method of claim 26, wherein the preamble is associated with a cyclic prefix.

29. The method of claim 26, further comprising:
transmitting configuration information indicating a configuration for the preamble.

30. The method of claim 29, wherein the configuration information indicates a numerology for the preamble.

* * * * *